United States Patent [19]

Konijn

[11] Patent Number: 5,300,132
[45] Date of Patent: Apr. 5, 1994

[54] CONTACTING DEVICE

[75] Inventor: Gerrit Konijn, Amsterdam, Netherlands

[73] Assignee: Shell Oil Company, Houston, Tex.

[21] Appl. No.: 21,386

[22] Filed: Feb. 23, 1993

[30] Foreign Application Priority Data

Mar. 25, 1992 [EP] European Pat. Off. ........ 92200854.5

[51] Int. Cl.$^5$ ...................... B01D 45/08; B01D 47/06
[52] U.S. Cl. .................................... 55/257.4; 55/348; 55/456
[58] Field of Search ..................... 55/183–188, 55/257.4, 348, 456

[56] References Cited

U.S. PATENT DOCUMENTS

| 1,846,248 | 2/1932 | Clarke | 55/456 |
| 3,345,046 | 10/1967 | Versluys et al. | 55/257.4 X |
| 3,605,388 | 9/1971 | Zuiderweg et al. | 55/257.4 X |
| 4,349,360 | 9/1982 | Schuurmans et al. | 55/348 X |
| 4,432,779 | 2/1984 | Honerkamp et al. | 55/185 X |
| 4,483,696 | 11/1984 | Zipay et al. | 55/186 |
| 4,755,198 | 7/1988 | Darton | 55/348 X |
| 4,767,424 | 8/1988 | McEwan | 55/184 |

FOREIGN PATENT DOCUMENTS

| 0048508 | 3/1982 | European Pat. Off. |
| 0083811 | 7/1983 | European Pat. Off. |
| 0124920 | 11/1984 | European Pat. Off. |
| 0169611 | 1/1986 | European Pat. Off. |
| 0232925A2 | 8/1987 | European Pat. Off. |
| 0331247A2 | 6/1989 | European Pat. Off. |

*Primary Examiner*—Robert Spitzer

[57] ABSTRACT

A device for the counter-current contacting of gas and liquid comprises a normally vertical column having a gas inlet and a liquid outlet at the lower end thereof and a gas outlet and a liquid inlet at the upper end thereof. The column contains gas/liquid contacting apparatus located between the gas inlet and the liquid inlet and a gas/liquid separation apparatus located above the gas/liquid contacting apparatus and below the liquid inlet. The separation apparatus includes a horizontal collection tray having passages communication with a separation device and with at least one vertical distribution tube extending through the horizontal collection tray to the gas/liquid separation apparatus. The separation device has a gas outlet communicating to the gas outlet of the column and a liquid outlet, which with the liquid inlet, discharges onto the horizontal collection tray. The device provides gas with a reduced quantity of entrained liquid and is useful for the drying of natural gas by contacting with ethylene glycol.

2 Claims, 1 Drawing Sheet

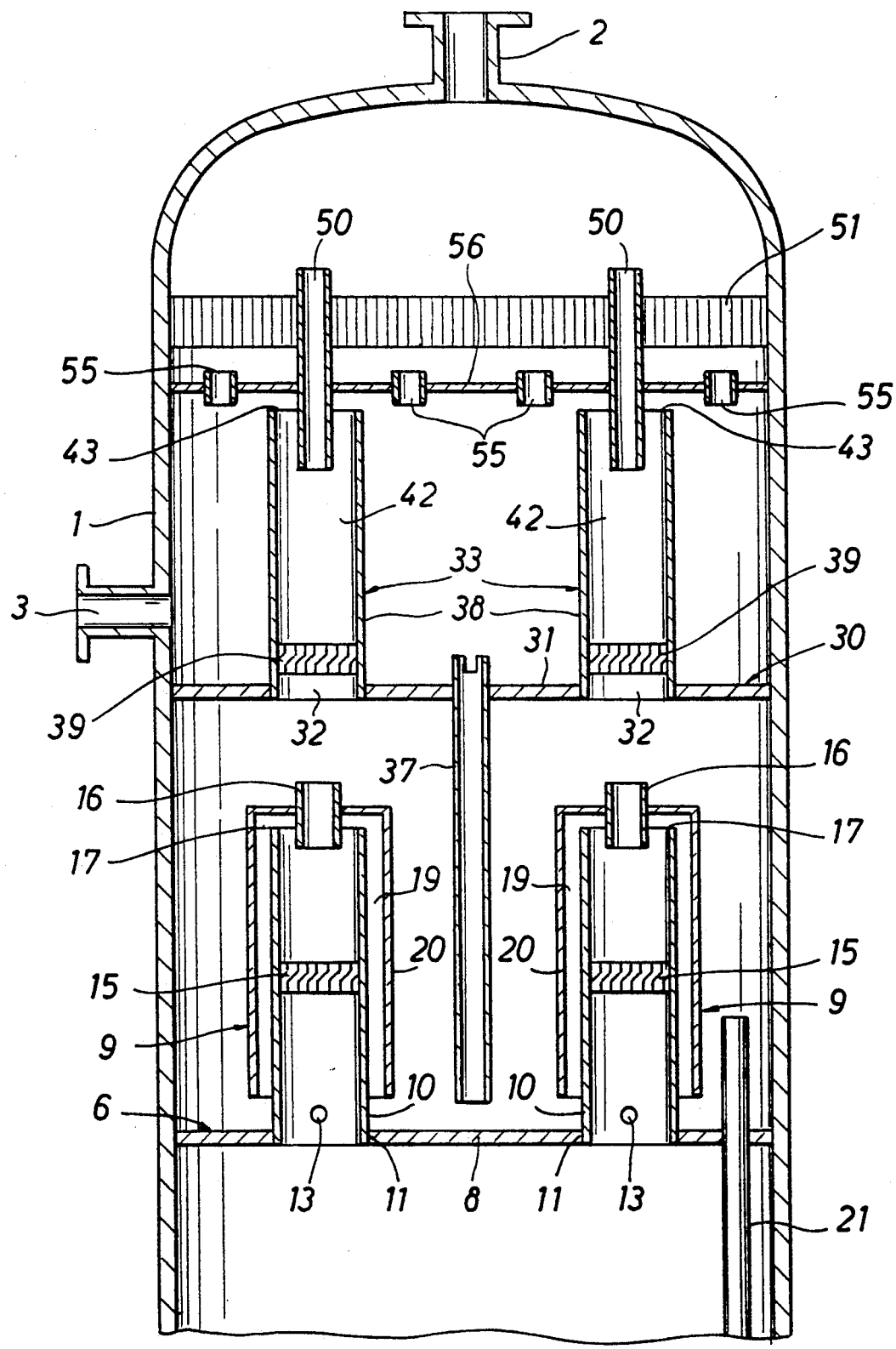

CONTACTING DEVICE

FIELD OF THE INVENTION

This invention relates to a device for counter-currently contacting gas and liquid, which device minimizes the entrainment of liquid in the gas.

BACKGROUND OF THE INVENTION

Columns for the counter-current contacting of gas and liquid are known in the art. One such device is disclosed by European Patent Application No. 169611. In this device, a liquid distributor is arranged above the gas/liquid contacting means of the column. The liquid distributor is provided with gas risers which communicate with the gas outlet of the column. Use of this contacting device does result, however, in a large amount of the liquid being entrained in the rising gas.

In European Patent Application No. 48508, a device is disclosed wherein the gas/liquid contacting means comprises a plurality of horizontal trays provided with contact swirl tubes arranged in openings of the tray. The contact swirl tubes have side entrances to allow liquid collected on the tray to enter and contact upwardly flowing gas in the contact swirl tube. These tubes also have outlets which communicate with a downcomer which discharges on the underlying tray.

In European Patent Applications 83811 and 124920 similar gas/liquid separators are disclosed which comprise a tray having separation swirl tubes. These separation swirl tubes can be used replacements for the trays of the device of European Patent Application 48508 when provided with a mixing chamber and separate inlets for gas and liquid. Thus, these latter two published applications combine contacting and separation in swirl tubes on each tray. However, it happens in these devices that good contacting will adversely affect separation, and vice-versa. Increasing the efficiency of the separation of each tray will necessarily restrict the flow of gas through that tray and thus reduce the contacting. It would be of advantage to provide a contacting-separation device which effectively performs both operations.

SUMMARY OF THE INVENTION

The present invention relates to a device for the counter-current contacting of gas and liquid which provides efficient gas-liquid contacting and yet results in reduced entrainment of liquid in the gas flowing from the device. This entrainment is substantially reduced from the levels of the conventional contacting-separation devices and desirably to a level as low as 10 liters of liquid per 1,000,000 $Nm^3$ of gas.

BRIEF DESCRIPTION OF THE FIGURE

The FIGURE depicts the upper portion of a device for counter-currently contacting gas and liquid wherein a relatively low level of liquid is entrained in the gas passing from the device.

DESCRIPTION OF THE INVENTION

The device of the invention comprises a normally vertical column having a gas inlet and a liquid outlet at the lower end and a gas outlet and a liquid inlet at the upper end. The column is provided with gas/liquid contacting means in the column between the gas inlet and the liquid inlet and a gas/liquid separator arranged above the gas/liquid contacting means but below the liquid inlet. The gas/liquid contacting means comprises at least one horizontal tray provided with two or more contact swirl tubes. Alternatively, the gas/liquid contacting means comprises conventional contact trays, structured packing or random packing. The gas/liquid separator, the uppermost functioning tray of the column, is provided with separation swirl tubes, a gas outlet communicating with the gas outlet of the column and a liquid outlet which discharges onto a collection tray. The gas/liquid separator is optionally additionally equipped with a demister mat.

In operation, the device of the invention serves to contact the counter-currently flowing gas and liquid in the contacting means and reserves the uppermost tray as separator to separate (and not extensively contact) the gas and the liquid. In this manner, the separation is more efficient than that of more conventional devices and the resulting entrainment of liquid in the rising gas is reduced.

The device of the invention is useful in the number of conventional industrial processes wherein gas and liquid are counter-currently contacted and subsequently separated. The device is particularly useful for drying natural gas by contacting the natural gas with ethylene glycol.

DETAILED DESCRIPTION OF THE FIGURE

The invention is further illustrated by reference to the accompanying FIGURE which depicts the upper section of a device for counter-currently contacting liquid and gas according to the invention. The device comprises a normally vertical column having a gas inlet (not shown) and a liquid outlet (not shown) at its lower end and a gas outlet 2 and a liquid inlet 3 as its upper end. The column 1 is provided with gas/liquid contacting means located within column 1 above the gas inlet in the lower end of the column 1 (not shown) and below the liquid inlet 3. The gas/liquid contacting means comprises a plurality of contacting devices axially spaced in column 1, of which only the uppermost contacting device 6 is shown.

The contacting device 6 includes a horizontal tray 8 provided with at least one contact swirl tube 9. Each contact swirl tube 9 is an open-ended vertical tube 10 located at an opening 11 in the horizontal tray 8. At the lower end, the vertical tube 10 is provided with one or more side entrances 13 (only one is shown per tube) communicating with the space above horizontal tray 9 and a swirl imparting means 15 is located within the vertical tube 10. The swirl imparting means is in the form of a plurality of vanes to impart rotation to a fluid flowing upwardly through the vertical tube 10. The contact swirl tubes 9 further comprises a gas outlet 16 and a liquid outlet 17 communicating with the upper end of the vertical tube 10. The liquid outlet 17, which alternatively is one or more axial slits in tube 10, communicates with an annular channel 19 between the vertical tube 10 and an outer tube 20. Material flowing through annular channel 19 discharges onto the horizontal tray 8. The contacting device 6 further includes a downcomer 21 for conveying liquid collected on tray 8 to the next underlying contacting device (not shown).

The column 1 is further provided with a gas/liquid separator 30 located above the gas/liquid contacting means 6 but below the liquid inlet 3, which separator includes a horizontal collection tray 31 having at least one passage 32 communicating with a corresponding number of separation devices by separation swirl tubes 33 and with a vertical distribution tube 37 extending through the horizontal collection tray 31 to the gas/liquid contacting means 6. The separation swirl tube 33 comprises a vertical tube 38 communicating with the passage 32 and provided with a swirl imparting means 39 in the form of a plurality of vanes at the lower end. Each separation swirl tube 32 has a gas outlet 42 communicating with the gas outlet 2 of the column 1 and a liquid outlet 43, which alternatively is one or more axial slits in tube 38, discharging onto the collection tray 31. The liquid inlet 3 also discharges onto the collection tray 31. During normal operation of the column 1, gas is supplied to the column 1 through the gas inlet (not shown) located below the contacting means 6 and passes upwardly through the column 1. Liquid is supplied to the column 1 through the liquid inlet 3 and the liquid flows over collection tray 31 until the liquid level is such that the liquid flows downwardly through distribution tube 37 onto the uppermost horizontal tray 8 of the gas/liquid contacting means.

Descending liquid and ascending gas contact each other in the contact swirl tubes 9 as liquid collected on the horizontal tray 8 enters into the contact swirl tube 9 from under horizontal tray 8. Liquid and gas are contacted in a mixing chamber of the vertical tube 9 upstream of the swirl imparting means 15 which cause gas and liquid to separate. Gas flows from the contact tube 9 through gas outlet 16 and liquid flows from the contact tube 9 through a liquid outlet 17 by way of annular channel 19 onto the vertical tray 8. As the liquid level rises on vertical tray 8, the liquid flows downwardly through the downcomer 21 to the next underlying contacting device 6. Liquid for the lowermost contacting device (not shown) flows through the downcomer of that device and leaves the column 1 through the liquid outlet (not shown).

The ascending gas flows through passages 32 to the separation device 33 of the gas/liquid separator 30 to be separated from the gas-entrained liquid in the swirl imparting means 39. Gas free of entrained liquid leaves through the gas outlet 42 of separation swirl tubes 33 and flows from the column 1 through gas outlet 2. The liquid thereby separated flows through the liquid outlet 43 and onto collection tray 31. This liquid, together with the liquid introduced by way of liquid inlet 3 flows through the distribution tube 37 and onto the uppermost contacting device of the contacting means 6.

In an optional modification of the device of the invention as shown, the gas/liquid separator is provided with gas outlets 50 extending through a demister mat 51 and with secondary gas outlet 55 in a tray 56 which is arranged under the demister mat 51.

What is claimed is:

1. A device for counter-currently contacting gas and liquid comprising a normally vertical column having a gas inlet and a liquid outlet at the lower end thereof and a gas outlet and a liquid inlet at the upper end thereof, which column is provided with gas/liquid contacting means arranged in the column between the gas inlet and the liquid inlet and with a gas/liquid contacting means arranged above the gas/liquid separation means and below the liquid inlet means, which separation means comprises a horizontal collection tray provided with passages communicating with a separation device and with at least one vertical distribution tube extending through the horizontal collection tray to the gas/liquid contacting means, wherein the separation device has a gas outlet which, together with the liquid inlet, discharges onto the horizontal collection tray.

2. The device of claim 1 wherein the horizontal collection tray has separation swirl tubes, each of which comprises an open-ended vertical tube arranged in an opening of the collection tray, the lower end of which tube communicating with the space below the collection tray, and each swirl tube having a gas outlet communicating with the gas outlet of the column and a liquid outlet discharging onto the collection tray.

* * * * *